(12) United States Patent
Maguire et al.

(10) Patent No.: US 10,396,574 B2
(45) Date of Patent: Aug. 27, 2019

(54) CHARGING LOCKER

(71) Applicant: Bretford Manufacturing, Inc., Franklin Park, IL (US)

(72) Inventors: Cary Maguire, Chicago, IL (US); Caleb Durante, Oak Park, IL (US); Mike Dombrowski, Elk Grove Village, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 18 days.

(21) Appl. No.: 15/873,103

(22) Filed: Jan. 17, 2018

(65) Prior Publication Data

US 2018/0205247 A1 Jul. 19, 2018

Related U.S. Application Data

(60) Provisional application No. 62/447,172, filed on Jan. 17, 2017.

(51) Int. Cl.
*H02J 7/00* (2006.01)
*A47B 96/02* (2006.01)
(Continued)

(52) U.S. Cl.
CPC .......... *H02J 7/0044* (2013.01); *A47B 96/021* (2013.01); *A47B 96/1408* (2013.01); *G06Q 20/18* (2013.01); *G07F 9/10* (2013.01); *G07F 15/006* (2013.01); *H02J 7/0027* (2013.01); *H02J 7/0042* (2013.01); *H02J 7/0021* (2013.01)

(58) Field of Classification Search
None
See application file for complete search history.

(56) References Cited

U.S. PATENT DOCUMENTS 4,732,358 A * 3/1988 Hughes ................ A47B 96/068
108/108
5,244,266 A 9/1993 Maldanis
(Continued)

FOREIGN PATENT DOCUMENTS

CN 202737489 U 2/2013
DE 102007057546 A1 6/2009
(Continued)

OTHER PUBLICATIONS

US 9,373,212 B2, 06/2016, Peters et al. (withdrawn)
(Continued)

*Primary Examiner* — Arun C Williams
(74) *Attorney, Agent, or Firm* — Anderson Gorecki LLP

(57) ABSTRACT

A charging locker includes a frame, and a plurality of modular shelf units. Each modular shelf unit having an integral floor, at least one side wall, and a back wall. The plurality of modular shelf units are configured to extend vertically above one another to form a stack of modular shelf units in which the side walls and back walls of the plurality of modular shelf units form nearly contiguous first and second surfaces. A plurality of tabs on corners of each of the modular shelf units are provided to be received in notches in the frame to support the modular shelf units relative to the frame. A plurality of electrical receptacles are also provided. At least one electrical receptacle is accessible from within each of the modular shelf units.

12 Claims, 20 Drawing Sheets

(51) Int. Cl.
*A47B 96/14* (2006.01)
*G07F 15/00* (2006.01)
*G06Q 20/18* (2012.01)
*G07F 9/10* (2006.01)

(56) References Cited

U.S. PATENT DOCUMENTS

| | | | |
|---|---|---|---|
| 5,819,981 A | 10/1998 | Cox | |
| 6,158,599 A | 12/2000 | Lazarus | |
| D665,596 S | 8/2012 | Shawcross et al. | |
| 8,509,944 B1 | 8/2013 | Kranyec | |
| 8,718,717 B2 | 5/2014 | Vaknin et al. | |
| 8,862,388 B2 | 10/2014 | Wu et al. | |
| 8,904,198 B1 | 12/2014 | Pinto et al. | |
| 8,917,497 B2 | 12/2014 | Bergum et al. | |
| D733,923 S | 7/2015 | Ento July et al. | |
| 9,129,461 B2 | 9/2015 | Luke et al. | |
| 9,205,159 B2 | 12/2015 | Kim | |
| 9,230,390 B2 | 1/2016 | Gospodarek | |
| 9,324,204 B2 | 4/2016 | Naghi et al. | |
| 9,330,520 B2 | 5/2016 | Phelps et al. | |
| 9,337,920 B2 | 5/2016 | Chen et al. | |
| 9,373,967 B1 | 6/2016 | Sullivan | |
| 10,135,268 B1* | 11/2018 | Gokcebay | H04B 1/3883 |
| 2003/0111245 A1 | 6/2003 | Haggerty | |
| 2003/0141840 A1 | 7/2003 | Sanders | |
| 2005/0104555 A1 | 5/2005 | Simmonds-Short | |
| 2005/0140253 A1* | 6/2005 | Fu | A47B 43/003 312/6 |
| 2007/0144981 A1 | 6/2007 | Nguyen | |
| 2009/0033456 A1 | 2/2009 | Castillo et al. | |
| 2009/0298553 A1 | 12/2009 | Ungari et al. | |
| 2010/0090567 A1 | 4/2010 | Felice | |
| 2011/0193524 A1 | 8/2011 | Hazzard et al. | |
| 2012/0078413 A1 | 3/2012 | Baker, Jr. | |
| 2012/0330462 A1 | 12/2012 | Maroney et al. | |
| 2013/0027183 A1 | 1/2013 | Wu et al. | |
| 2013/0110653 A1 | 5/2013 | Rivers, Jr. et al. | |
| 2013/0335027 A1 | 12/2013 | Xin | |
| 2014/0135042 A1 | 5/2014 | Buchheim et al. | |
| 2014/0214500 A1 | 7/2014 | Hudson et al. | |
| 2014/0232320 A1 | 8/2014 | Ento July et al. | |
| 2014/0239883 A1 | 8/2014 | Hobson et al. | |
| 2015/0077221 A1 | 3/2015 | Peters et al. | |
| 2015/0084590 A1 | 3/2015 | Pearlman | |
| 2015/0220897 A1 | 8/2015 | Weatherdon et al. | |
| 2015/0363749 A1 | 12/2015 | Buscher et al. | |
| 2016/0020625 A1 | 1/2016 | Tsou | |
| 2016/0068075 A1 | 3/2016 | Chen et al. | |
| 2016/0156207 A1 | 6/2016 | Frankenberger | |
| 2016/0276852 A1 | 9/2016 | Roberts | |

FOREIGN PATENT DOCUMENTS

| | | |
|---|---|---|
| DE | 102011009898 A1 | 8/2012 |
| DE | 202013008511 U1 | 1/2014 |
| EP | 1962405 A2 | 5/2007 |
| EP | 2101390 A2 | 9/2009 |
| EP | 2905169 A2 | 8/2015 |
| GB | 2428525 A | 1/2007 |
| GB | 2440007 A | 1/2008 |
| GB | 2487976 A | 8/2012 |
| GB | 2490716 A | 11/2012 |
| JP | H 09245841 A | 9/1997 |
| JP | 2005190450 A | 7/2005 |
| JP | 2014011862 A | 1/2014 |
| WO | WO 85/01812 | 4/1985 |
| WO | WO 2005/076233 A1 | 8/2005 |
| WO | WO 2011/017757 A1 | 2/2011 |
| WO | WO 2013/156956 A1 | 10/2013 |
| WO | WO 2015/090074 A1 | 6/2015 |

OTHER PUBLICATIONS

International Search Report from related International Application PCT/US2018/013960, dated May 3, 2018 (12 pages).
TekStak product literature (2 pages).
Lock-n-charge Fuyl Cell product literature (2 pages).
American Locker product literature (5 pages).
Precision Locker product literature (5 pages).
Orion Charging Station product literature (3 pages).
Smartecarte product literature (2 pages).
Brightbox product literature (3 pages).
ChargeTech product literature (15 pages).
LapSafe product literature (5 pages).
SafeCharge product literature (2 pages).

* cited by examiner

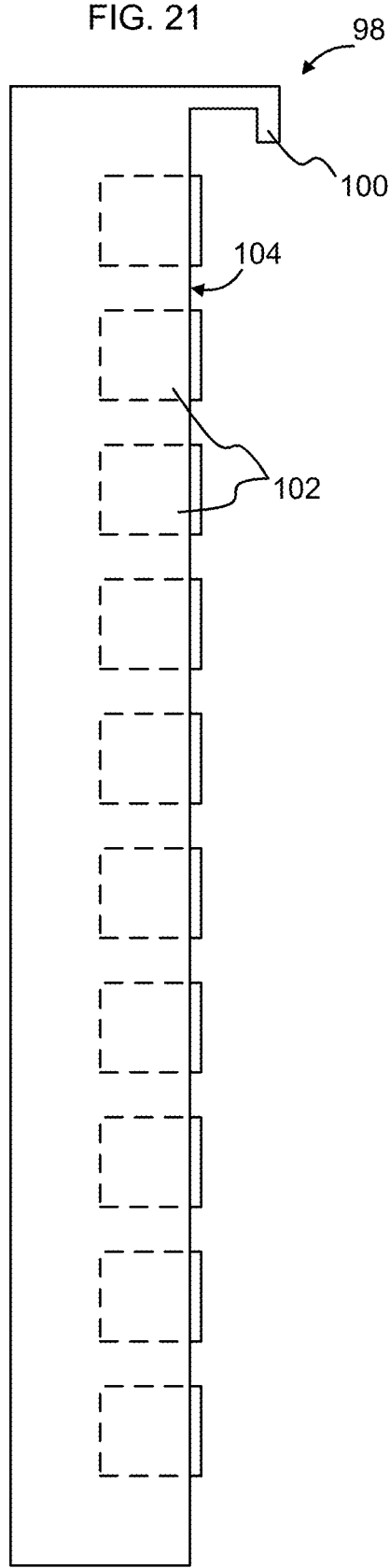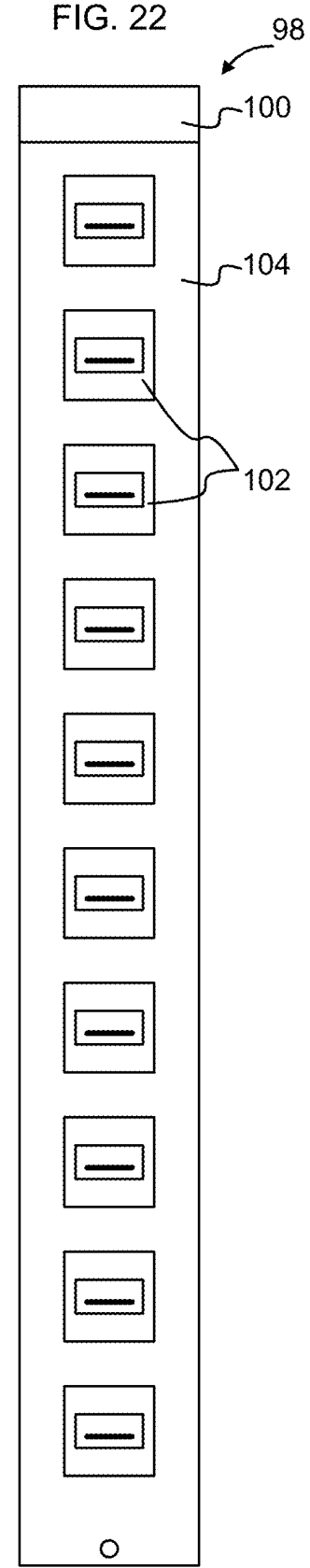

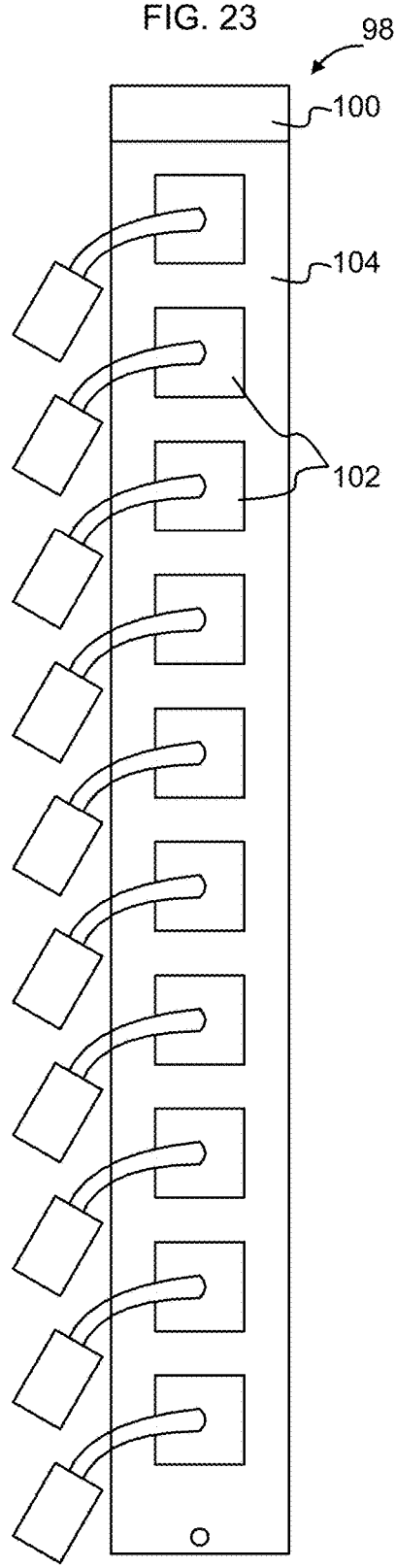
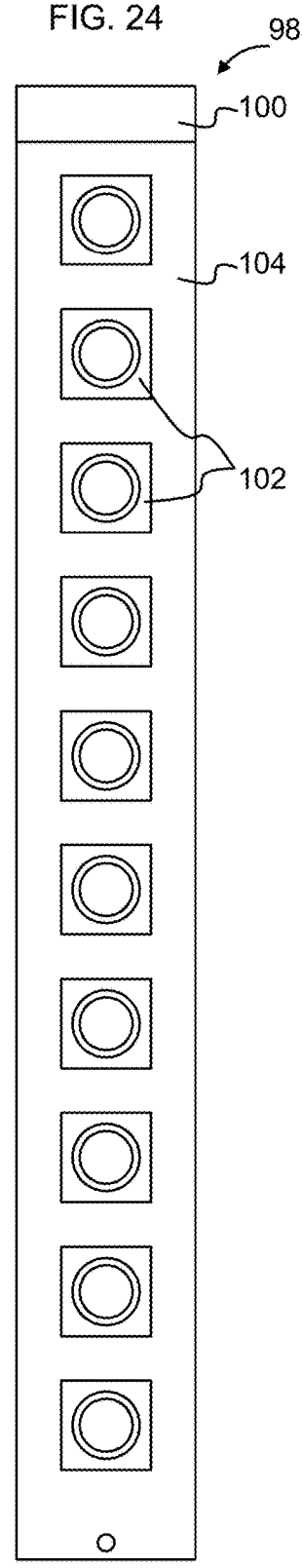

CHARGING LOCKER

CROSS-REFERENCE TO RELATED APPLICATIONS

This application claims priority to U.S. Provisional Patent Application 62/447,172, filed Jan. 17, 2017, entitled Charging Locker, the content of which is hereby incorporated herein by reference.

BACKGROUND

This disclosure relates to a charging locker designed to provide secure individual charging stations, and, more particularly, to a charging locker system that is economical to manufacture.

SUMMARY

All examples and features mentioned below can be combined in any technically possible way.

In some embodiments a charging locker, includes a frame, and a plurality of modular shelf units. Each modular shelf unit having an integral floor, at least one side wall, and a back wall. The plurality of modular shelf units are configured to extend vertically above one another to form a stack of modular shelf units in which the side walls and back walls of the plurality of modular shelf units form nearly contiguous first and second surfaces. A plurality of tabs on corners of each of the modular shelf units are provided to be received in notches in the frame to support the modular shelf units relative to the frame. A plurality of electrical receptacles are also provided. At least one electrical receptacle is accessible from within each of the modular shelf units.

In some embodiments, the plurality of tabs are formed on two front corners and one rear corner of the each of the modular shelf units.

In some embodiments, a first of the tabs is formed on a first of the front corners to slide into a first forward-facing notch on the frame, a second of the tabs is formed on a second of the front corners of the modular shelf unit to slide into a second rearward facing notch on the frame, and a third of the tabs is formed on the rear corner of the modular shelf unit to slide into a third forward facing notch on the frame.

In some embodiments, the plurality of tabs are configured to enable the tabs to selectively engage the notches when the modular shelf unit is rotated a first direction, and are configured to enable the tabs to selectively disengage from the notches when the modular shelf unit is rotated in a second direction.

In some embodiments, the tabs are formed on the floor of each modular shelf unit.

In some embodiments, lower modular shelf units in the stack of modular shelf units support upper modular shelf units in the stack of modular shelf units.

In some embodiments, each modular shelf unit has two side walls located on opposite sides of the floor and connected to the back wall along first edges to define four sides of a rectangular box.

In some embodiments, the charging locker further includes a power/data access window defined in one of the sides of each of the modular shelf units; wherein the at least one electrical receptacle is accessible from within the modular shelf unit via the power/data access window.

In some embodiments, the charging locker further includes at least one power strip, the at least one power strip containing a first subset of the plurality of electrical receptacles and being configured as a modular unit to be selectively inserted into the charging locker to present the electrical receptacles at the power/data access windows.

In some embodiments, the frame defines a wiring and access compartment along one side of the modular shelf units, and wherein the at least one power strip is contained within the wiring and access compartment.

In some embodiments, the charging locker further includes a base cabinet formed below the frame and modular shelf units, the base cabinet comprising a pair of rack mount rails to support electronic equipment for supplying power and data services to the electrical receptacles.

In some embodiments, the electrical receptacles include a plurality of Universal Serial Bus (USB) ports.

In some embodiments, the frame includes a front rectangular shaped support, a rear rectangular shaped support, four corner transverse pieces connecting the front rectangular shaped support and rear rectangular shaped support at respective corners, and a front intermediate vertical support column spanning from a top bar of the front rectangular shaped support to a bottom bar of the front rectangular shaped support.

In some embodiments, each the modular shelf units are supported by a first vertical bar of the front rectangular shaped support, a second vertical bar of the rear rectangular shaped support, and the front intermediate vertical support column.

BRIEF DESCRIPTION OF THE DRAWINGS

FIG. 21 is a left side view of a power strip according to some embodiments.

FIGS. 22-25 are front views of example power strips according to some embodiments.

FIGS. 26-28 show several example filler panels, in which FIG. 26 is a side view of an example filler panel and FIGS. 27-28 show front views of two example filler panels.

DETAILED DESCRIPTION

Lockers provide individual compartments that may be individually opened and individually secured. Charging lockers are similar but additionally provide one or more sources of power within the locker bays to allow electronic devices contained in the locker bays to be charged while stored therein. Charging lockers may be usefully deployed in environments where individuals may have a need to securely store portable handheld devices, tablet computers, and laptop computers, while the devices receive charging power. Example venues may include schools, airports, malls, restaurants, bars, theatres, amusement parks, and arenas, although virtually any public place may provide a suitable candidate location for a charging locker.

This disclosure is based, at least in part, on the realization that it is desirable to provide a charging locker that is secure, economical to manufacture, and easy to service. In some embodiments, all components of the charging locker other than the frame should be able to be replaced without requiring the charging locker to be removed from where it is installed.

Figure 1:
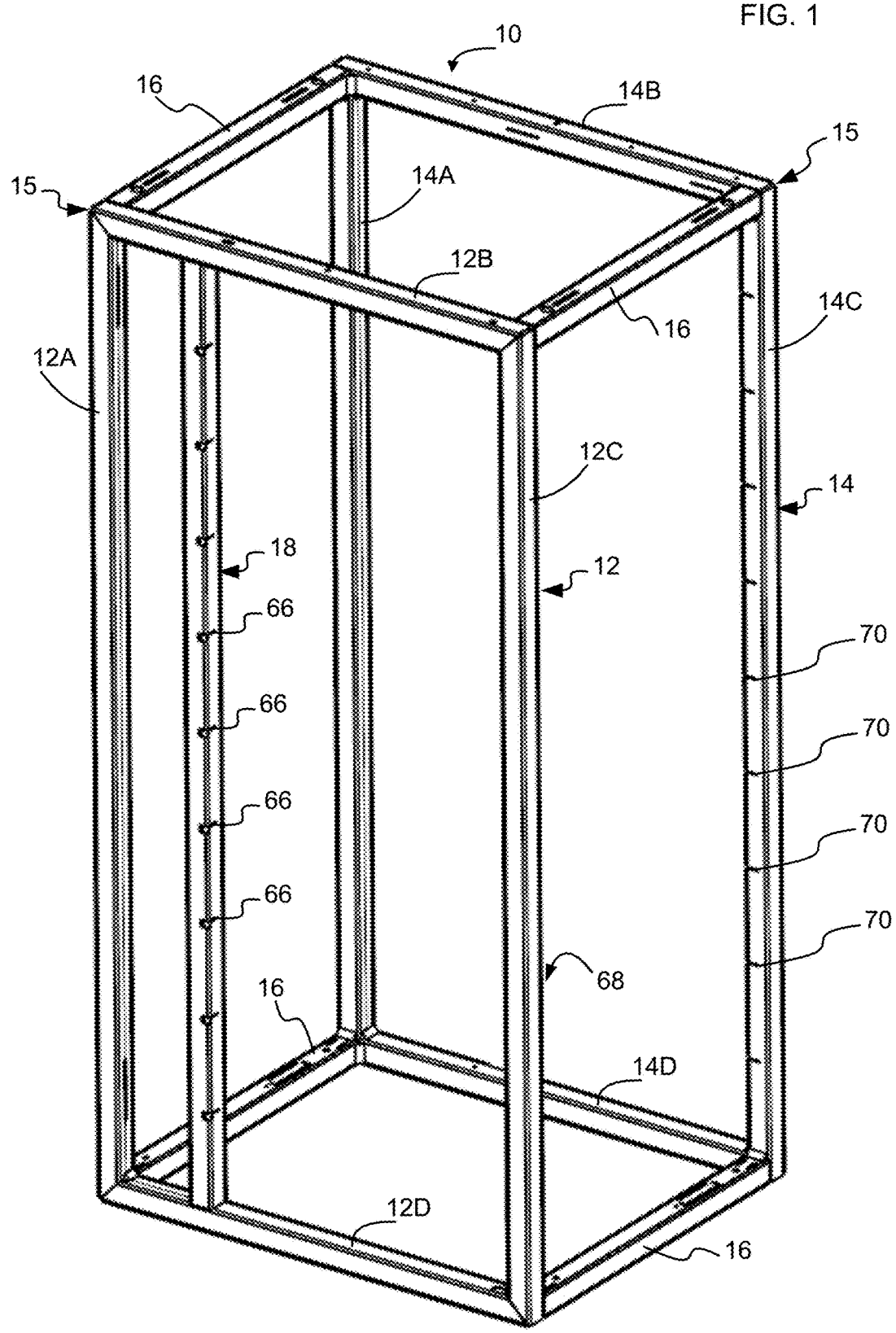
FIG. 1 is a front perspective view of an example frame for a charging locker according to some embodiments.
Figure 2:
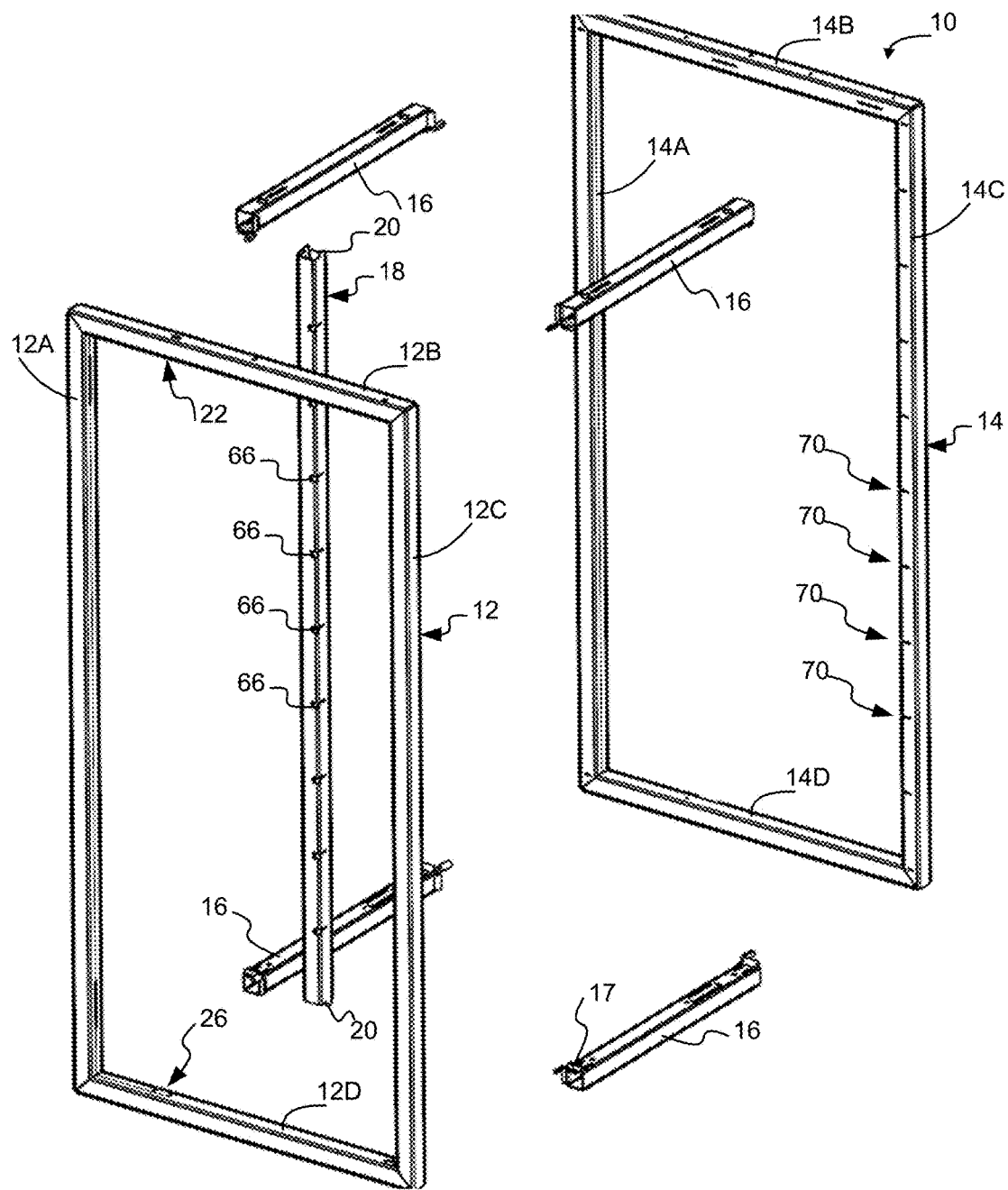
FIG. 2 is an exploded view of the example frame for a charging locker of FIG. 1.

FIG. 1 is a perspective view of a frame 10 of an implementation of a charging locker according to some embodiments. FIG. 2 is an exploded view which shows the frame 10 broken apart into constituent components. As shown in FIGS. 1-2, the frame 10 includes a front support 12, a rear support 14, and four corner transverse pieces 16. The frame 10 also includes a front intermediate vertical support column 18.

In an implementation, the front support 12 includes bars 12A, 12B, 12C, and 12D, that are formed from a single piece of rectangular tubing, e.g. square tubing. The tubing, in this implementation, is notched to form cutout areas and bent at the cutout areas to form miter joints at the corners 15. The miter joints are then welded together, to enable a single piece of tubing to be used to form the front support 12. The rear support 14 includes bars 14A, 14B, 14C, and 14D. In some embodiments, the rear support 14, like the front support 12, is also implemented using a single piece of tubing that has been notched and bent at the cutout areas to form miter joints at the corners 15. The miter joints are then welded together, to enable a single piece of tubing to be used to form the rear support 14.

In an implementation, the corner transverse pieces 16 have ends that are flared to form locating tabs 17 (see FIG. 2) that fit into corresponding slots on front support 12 and rear support 14. The ends of the four corner transverse pieces are respectively welded to the four corresponding corners of the front support 12 and rear support 14. In another implementation, the corner transverse pieces may be fastened to the front and rear supports 12, 14 using mechanical fasteners.

Front intermediate vertical support column 18 has projecting tabs 20 on upper and lower ends. Tabs 20 are received in first corresponding slots 22 on upper horizontal member 12B of front support 12 and second corresponding slots 26 on lower horizontal member 12D of front support 12. The front intermediate vertical support column 18 optionally may be welded to the front support 12 as shown in FIG. 1. The resulting frame, as shown in FIG. 1 is a rectangular box formed with a minimal number of components.

Figure 3:
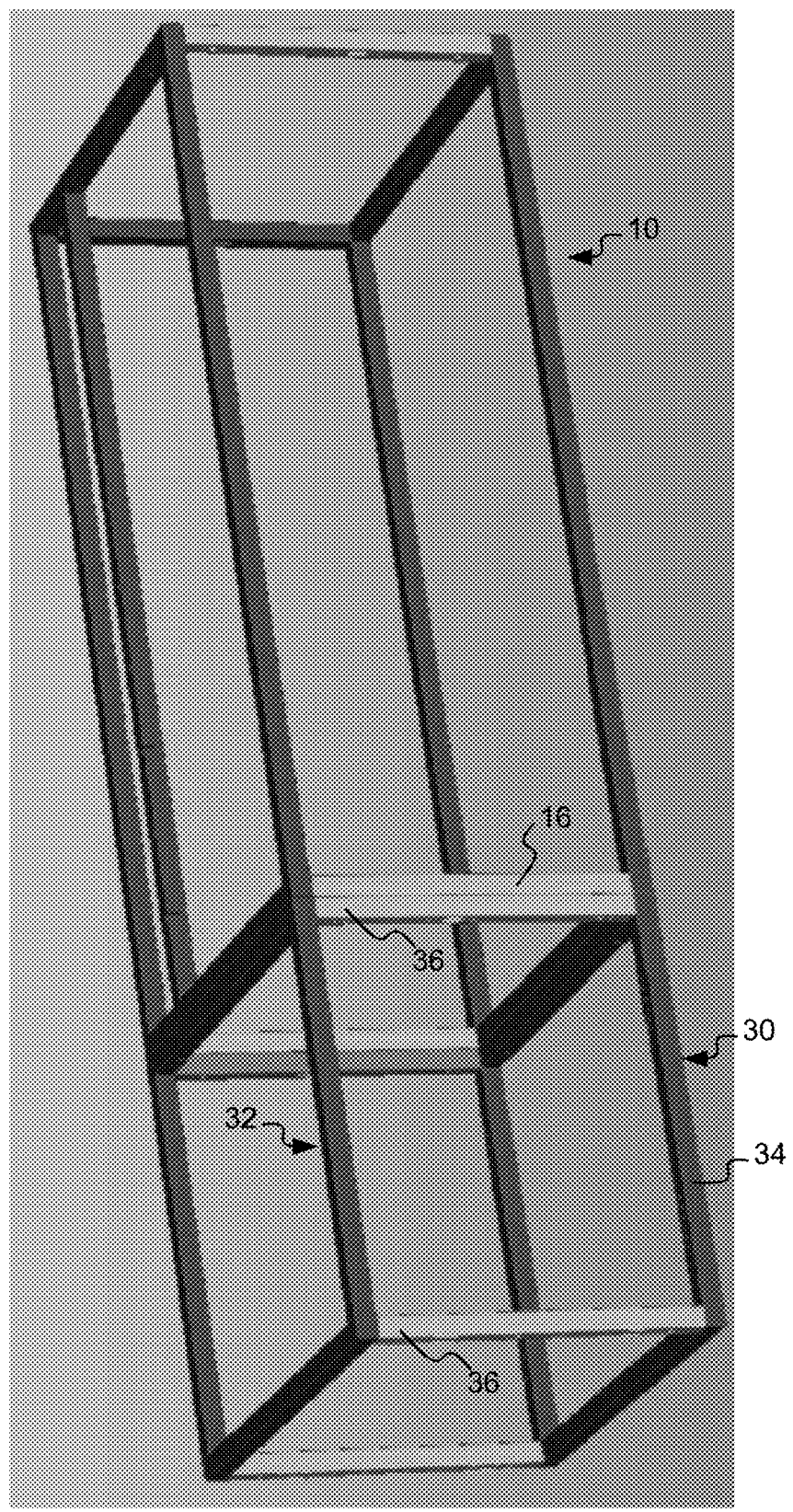
FIG. 3 is a lower front perspective view of the example frame for a charging locker of FIG. 1 with an added lower base frame according to some embodiments.

FIG. 3 shows the frame 10 from a lower right front perspective view. As shown in FIG. 3, the frame 10 optionally may be attached to a lower frame 30 of a base cabinet 29 that is constructed similarly to the frame 10. Specifically, in an implementation, lower frame 30 includes a lower front support 32 formed from a single piece of tubing that is notched, bent to form miter joints, and welded. The lower fame 30, in this implementation, also includes a lower rear support 34 formed from a single piece of tubing that is notched, bent to form miter joints, and welded. Lower corner transverse pieces 36 are tabbed and welded to the corners of the lower front support and lower rear support to finish the lower frame into a rectangular solid frame. Although an implementation is shown in FIG. 3 in which lower frame 30 and upper frame 10 are separately formed, in another implementation a single combined upper/lower frame may be formed as a unified frame structure. Likewise, although in some embodiments the front intermediate vertical support column 18 is formed toward the left-hand side of the frame, in other implementations the front intermediate vertical support column 18 may be formed toward the right-hand side of the frame. Thus, while an implementation will be described in which the front intermediate vertical support column 18 is formed toward the left-hand side of the frame, it should be recognized that a mirror image construction is likewise possible and contemplated.

Figure 4:
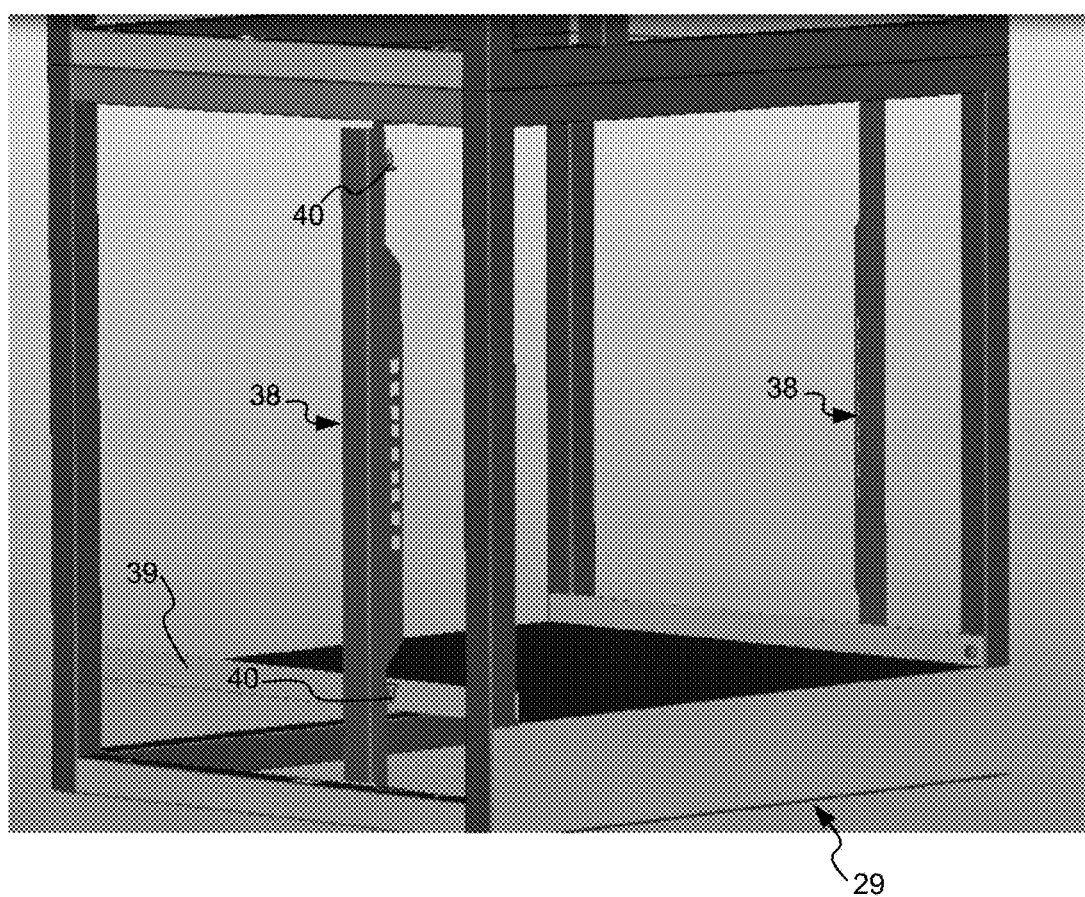
FIGS. 4-5 are a side perspective views of the lower base frame of FIG. 3.
Figure 5:
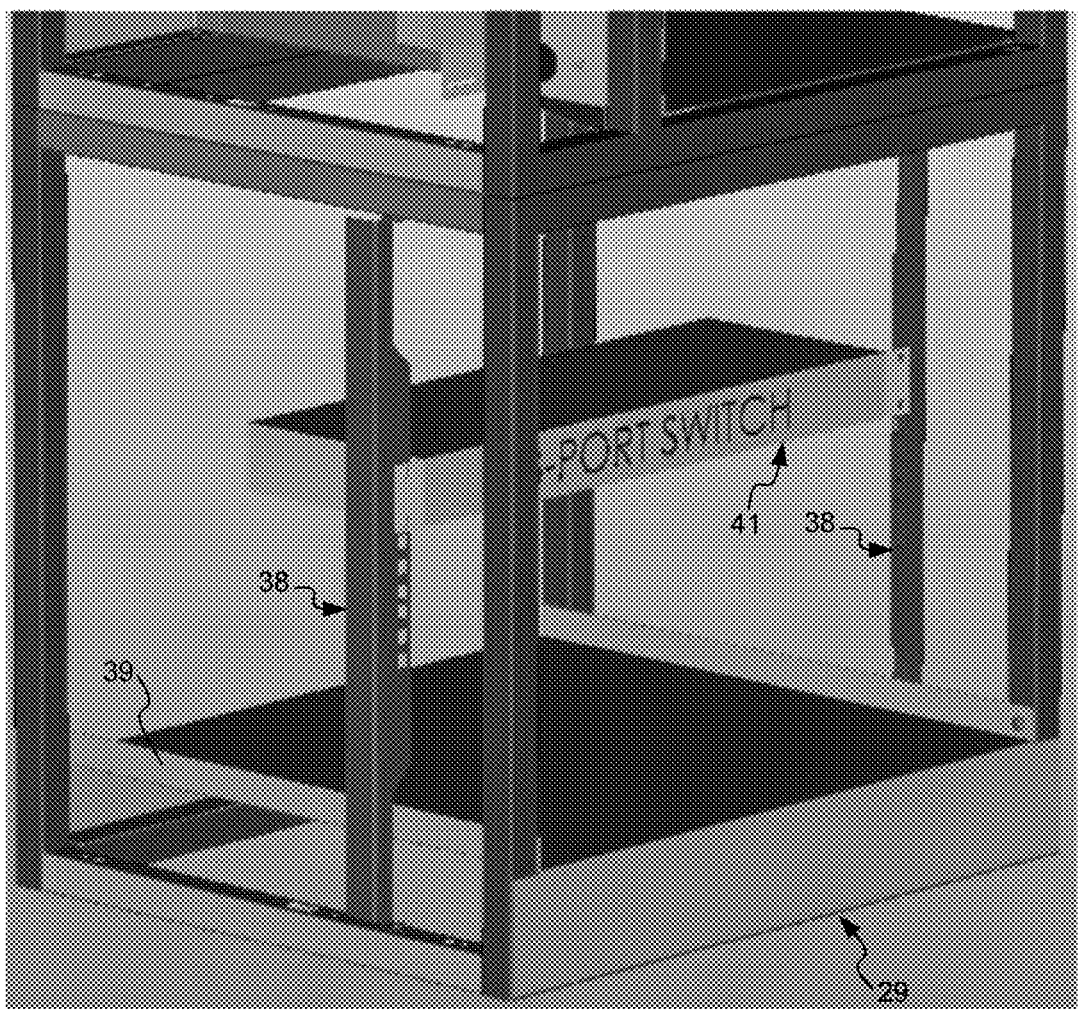

FIG. 4 shows an implementation in which rack mount rails 38 are connected between the transverse pieces 36 of the lower frame 30. The rack mount brackets 38 are joined to the lower frame 30 using fasteners 40 or welds. In one implementation, the lower frame 30 and the rack mount rails 38 are sized to form an EIA rack. The EIA (Electronic Industries Affiance) standard server rack is a 19-inch wide rack enclosure with rack mount rails which are 17¾" (450.85 mm) apart and whose height is measured in 1.75" (44.45 mm) unit increments. As shown in FIG. 5, electronic equipment 41 is mounted on the rack mount rails 38 to interconnect the components of the locker system with one or more other locker systems and/or external networks, and to perform power management within the locker system. For example, as shown in FIG. 5, electronic equipment 41 in the form of a multi-port switch may be mounted on the rack mount rails. Similarly, a gateway (not shown) and/or power management system may be mounted on the rack mount rails 38. Other electrical equipment such as a blade server or other computer equipment having mounting hardware conforming with the IEA standard may likewise be mounted on the rack mount rails 38 within lower frame 30. Optionally a base cabinet shelf 39 may be provided to facilitate storage of additional items in the base cabinet 29.

Figure 6:
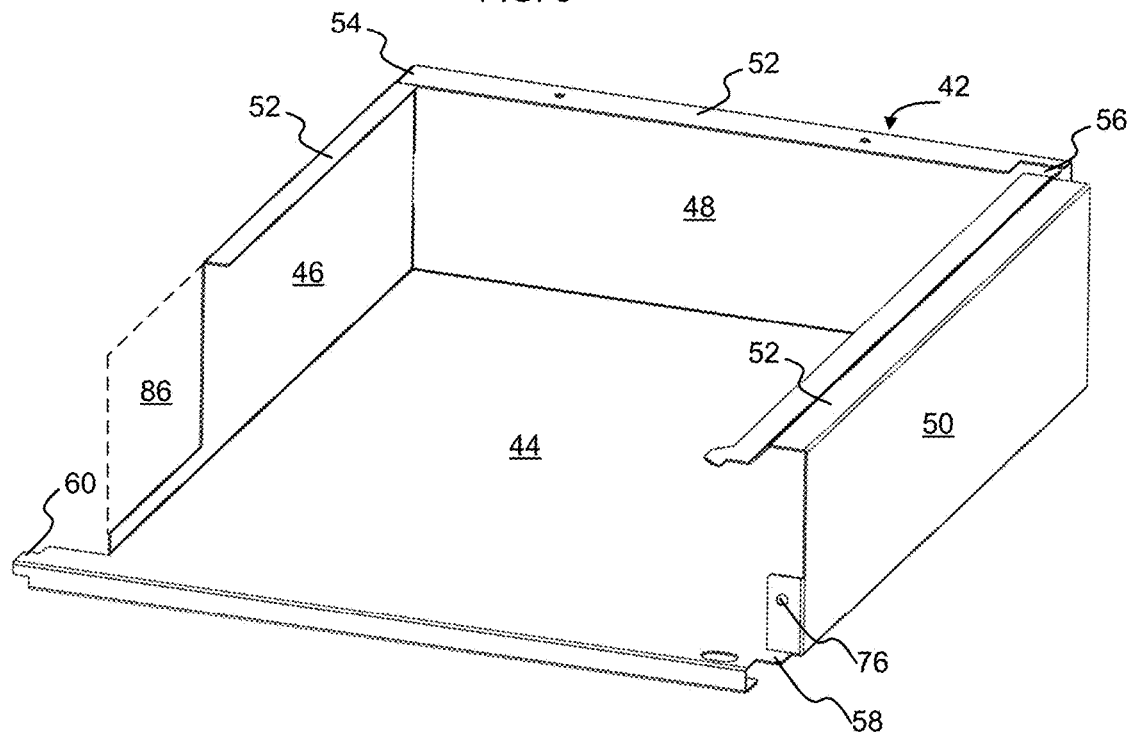
FIGS. 6-9 are perspective views of several example modular shelf units for use in the example charging locker of FIG. 1 according to some embodiments.
Figure 7:
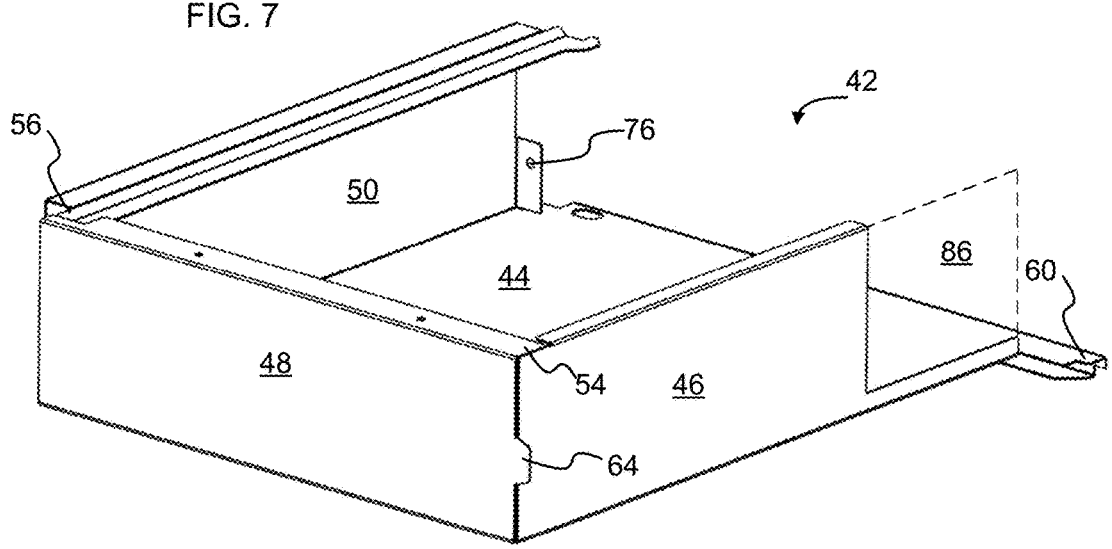
Figure 8:
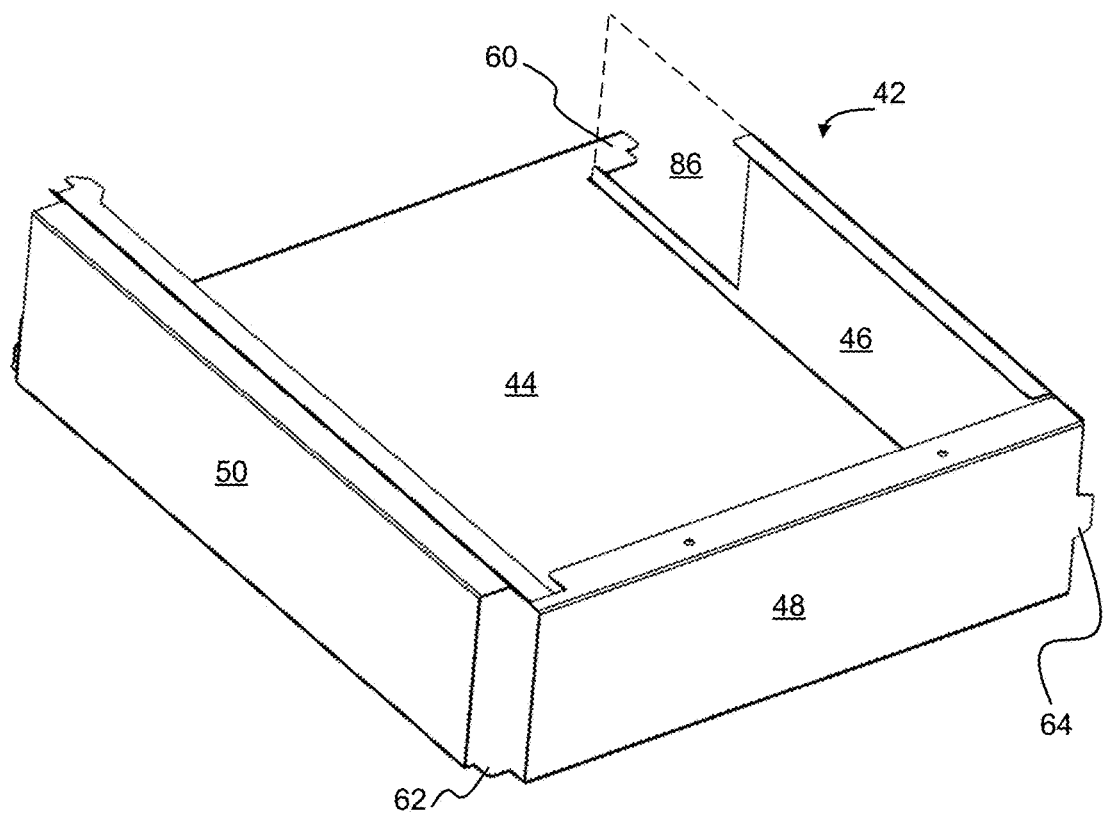

FIG. 6 is a front perspective view of an implementation of a modular shelf unit 42. FIGS. 7 and 8 are rear perspective views of an implementation of a modular shelf unit 42. In the implementation shown in FIGS. 6-8, each modular shelf unit has an open front and an open top, and an integral floor 44, a left side wall 46, a back wall 48, and a right-side wall 50. The integral floor 44, left side wall 46, back wall 48, and right-side wall 50 in one implementation are stamped from a single piece of metal and bent to form the modular shelf unit. Optionally the back corners between the left side wall 46 and back wall 48, and between the right-side wall 50 and back wall 48, may be tack welded together to increase the rigidity of the modular shelf unit.

Figure 9:
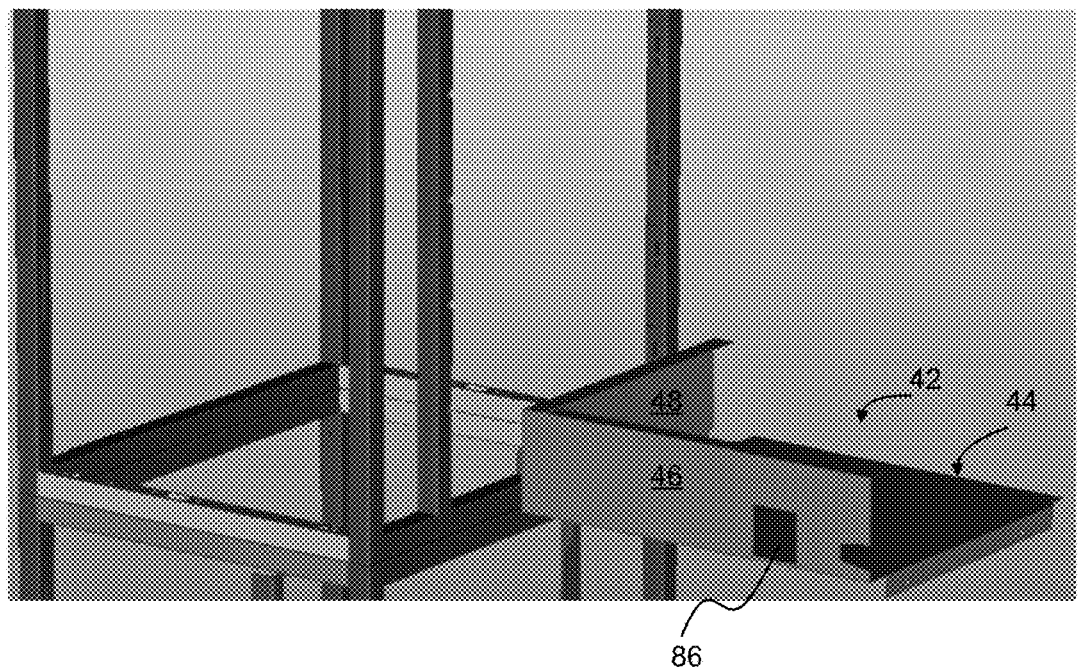

FIG. 9 is a front perspective view of another implementation of a modular shelf unit 42. In the implementation shown in FIG. 9, each modular shelf unit has an open front, an open top, and an open right side, and an integral floor 44, a left side wall 46, and a back wall 48. The integral floor 44, left side wall 46, and back wall 48 in one implementation are stamped from a single piece of metal and bent to form the modular shelf unit. Optionally the back corners between the left side wall 46 and back wall 48 may be tack welded together to increase the rigidity of the modular shelf unit.

The difference between the implementations shown in FIGS. 6-8 and FIG. 9 is that the shelf unit 42 in FIGS. 6-8 has three walls 46, 48, 50, whereas the implementation shown in FIG. 9 only has two walls 46, 48.

As shown in FIG. 6, in some implementations the side wall designated to separate the interior of the modular shelf unit with a wiring and access compartment 78 is provided with a power/data access window 86. For example, as shown in FIGS. 6-8, the left side wall 46 may be formed shorter than the floor 44 to define the power/data access window 86. Alternatively, as shown in FIG. 9 a cutout region (aperture) may be created in the left side wall 46 to form the power/data access window 86. The power/data access window 86 enables power to be provided within the modular shelf unit 42 as discussed in greater detail below.

Referring to FIGS. 6-8, in one implementation top flanges 52 are provided on each of the left side wall 46, back wall 48, and right-side wall 50. In the implementation such as shown in FIG. 9, top flange 52 is formed on left side wall 46 and back wall 48. Top flanges 52 provide lateral strength to the walls 46, 48, 50, to help prevent deformation of the walls. In an implementation where shelf unit 42 is stamped from a single piece of metal and bent to form the modular shelf unit, the flanges similarly may be formed by being included in the stamp blank and bent as shown in FIGS. 6-8 and 9 when the shelf unit blank is bent to form the shelf unit. Optionally top flanges may be welded together at top left corner 54 and top right corner 56.

Modular shelf units 42 are designed to be stacked on top of each other within the frame 10 of the storage locker such that the lower modular shelf units support the upper modular shelf units. In one implementation, when multiple modular shelf units 42 are stacked on top of each other to form a stack of similarly configured modular shelf units, the top flanges 52 of a lower modular shelf will parallel the floor 44 of an immediately higher modular shelf unit 42 in the stack. In one implementation, the top flanges 52 of a lower modular shelf unit 42 will contact the floor 44 of an immediately higher modular shelf unit 42 in the stack to enable the upper modular shelf unit(s) in the stack to be at least partially supported by the lower modular shelf unit(s).

Figure 10:
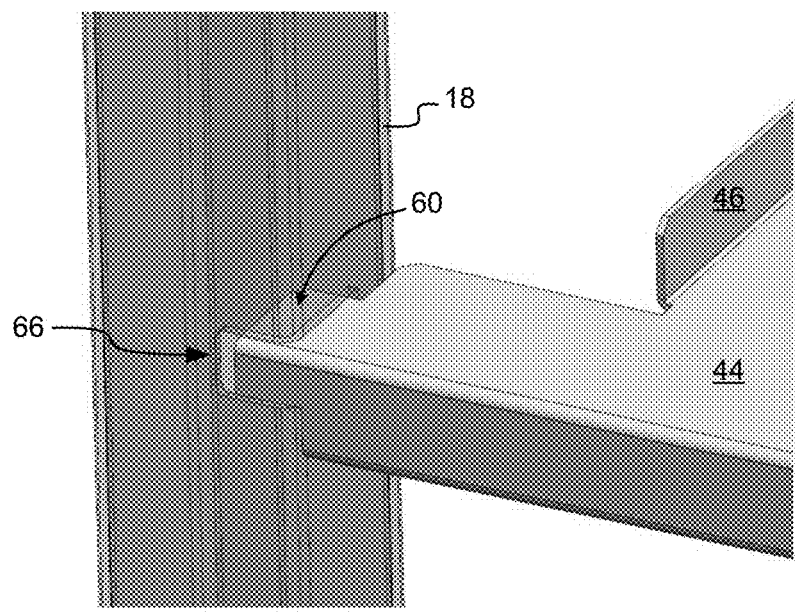
FIGS. 10-12 are perspective views of intersections between the example modular shelf units of FIGS. 6-9 and the example frame of FIG. 1 according to an implementation.
Figure 11:
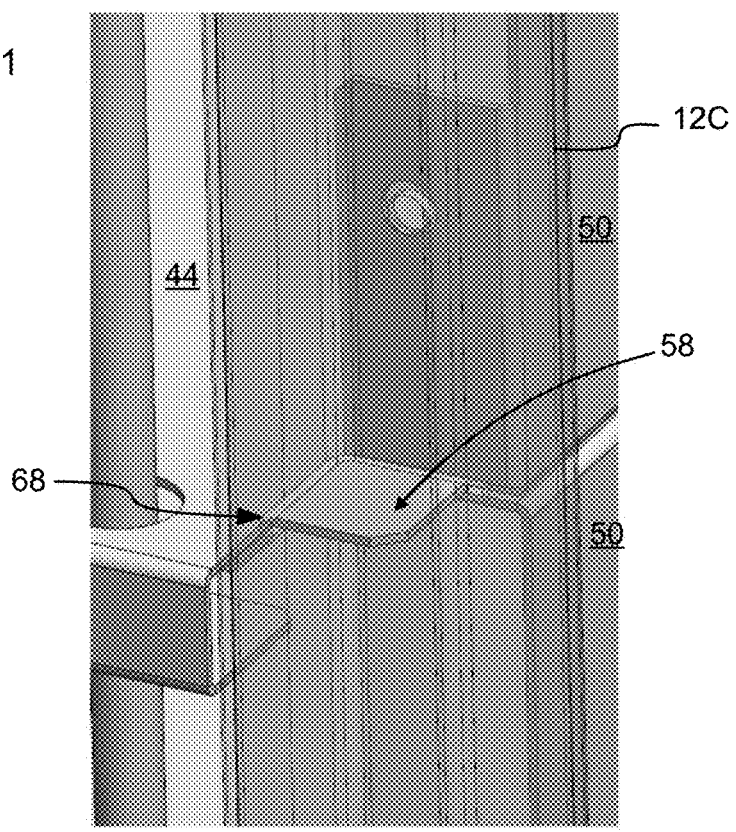
Figure 12:
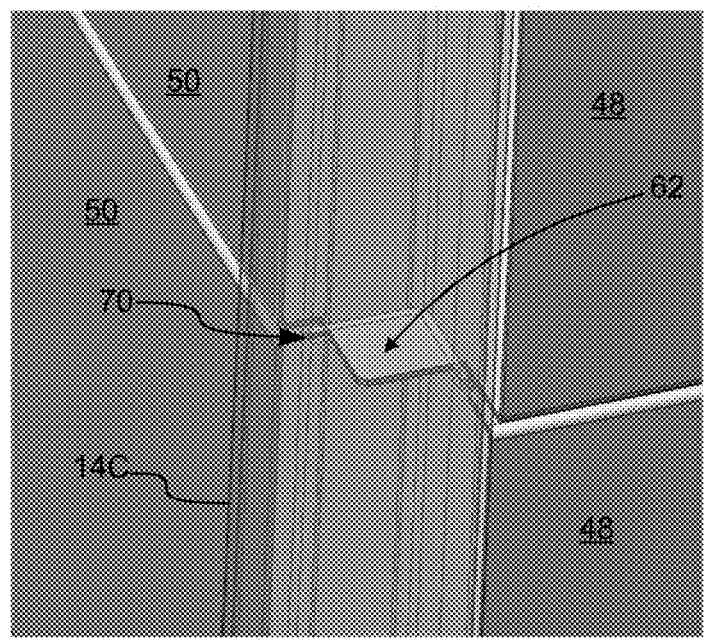

FIGS. 10-12 show additional details of how the modular shelf units 42 are attached to the frame 10 according to some embodiments. As shown in FIGS. 6-8, in some embodiments the floor 44 of modular shelf unit 42 is shaped to define front right support tab 58, front left support tab 60, and right rear support tab 62. A rear vertical support tab 64 is formed on the left edge of the rear wall to protrude beyond the left side wall 46.

As shown in FIG. 1, in one implementation a first set of notches 66 are formed on the front right interior corner of the front intermediate vertical support column 18. When modular shelf unit 42 is mounted in the frame 10, the front left support tab 60 slides into one of the notches 66 in the front intermediate vertical support column 18 from the front of the intermediate vertical support column 18. A partially transparent view of an example front, left support tab 60 engaged in notch 66 of front intermediate vertical support column 18 is shown in FIG. 10.

A second set of notches 68 are formed in the inside rear corner of the front right vertical bar 12C of front support 12. When modular shelf unit 42 is mounted in the frame 10, the front right support tab 58 slides into one of the notches 68 in the inside rear corner of the front right vertical bar 12C of front support 12. A partially transparent view of an example front-right support tab 58 engaged in notch 68 of front right vertical bar 12C of front support 12 is shown in FIG. 11.

A third set of notches 70 are formed in the inside front corner of the rear right vertical bar 14C of rear support 14. When modular shelf unit 42 is mounted in the frame 10, the rear right support tab 62 slides into one of the notches 70 in the inside front corner of the rear right vertical bar 14C of rear support 14. A partially transparent view of an example rear, right support tab 62 engaged in notch 70 of rear right vertical bar 14C of rear support 14 is shown in FIG. 12.

As described in connection with FIGS. 10-12, the front left tab support 60 slides into notch 66 on intermediate vertical support column 18 from the front, whereas front right support tab 58 and rear right support tab 62 engage notches 68, 70 respectively from inside the frame 10. This allows the modular shelf unit 42 to be inserted into the frame and rotated slightly to cause each of the support tabs to engage its respective notch. Removal of a modular shelf unit 42 may be accomplished by rotating the modular shelf unit 42 slightly to disengage the tabs from the notches, and then extracting the modular shelf unit 42 from the frame 10.

In one implementation, each modular shelf unit is additionally secured to the front right vertical bar 12C of frame 10 using a single fastener such as a machine screw that extends from an interior of the modular shelf unit through aperture 76 and into a corresponding aperture in front right vertical bar 12C. By minimizing the number of fasteners that are required to install a set of modular shelf units into a storage cabinet, it is possible to dramatically reduce the assembly time associated with manufacturing the storage cabinet.

Figure 13:
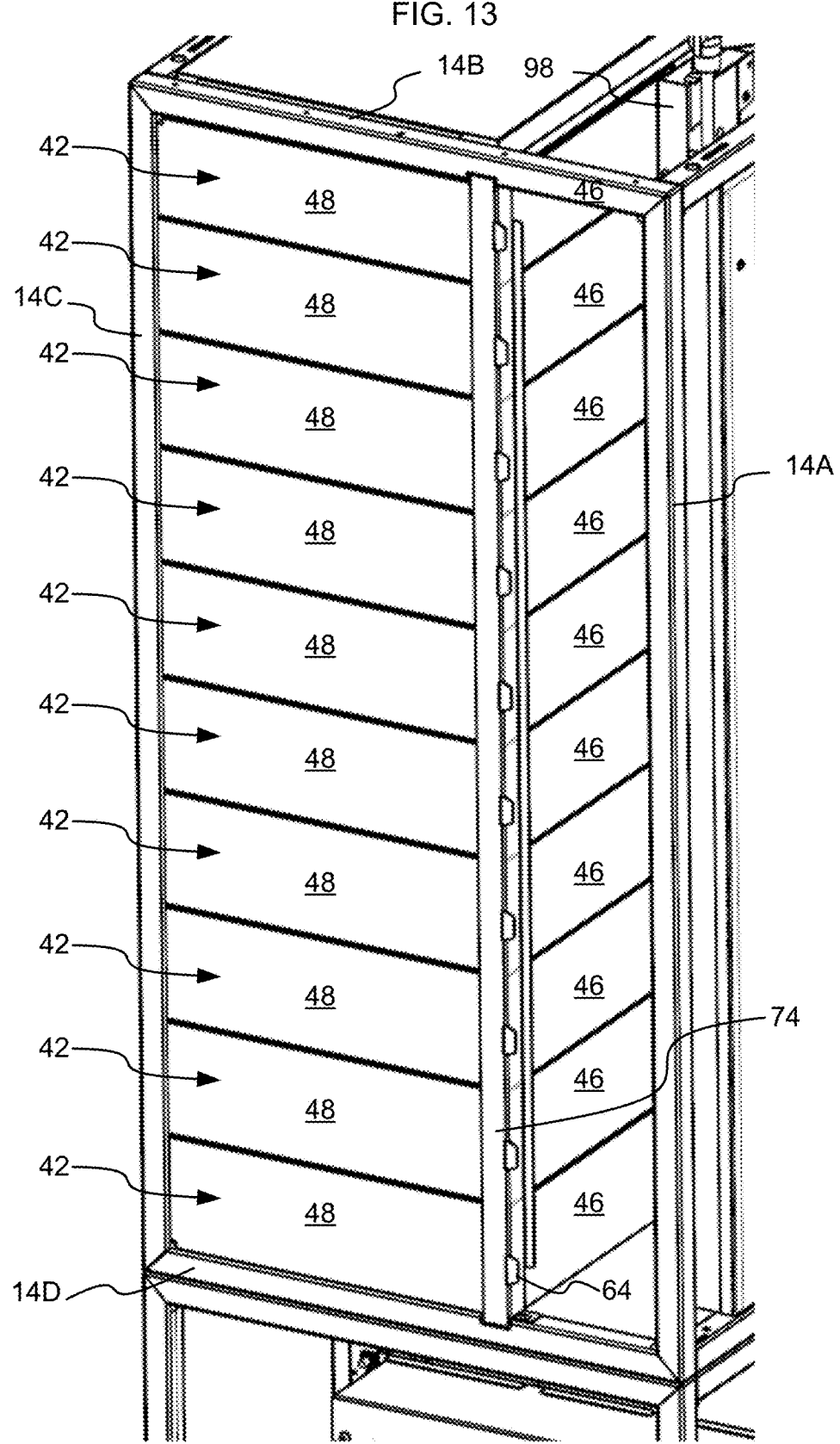
FIGS. 13-14 are rear perspective views of an example charging locker according to some embodiments.

FIG. 13 is a rear perspective view of a storage locker having a stack of similarly configured modular shelf units 42 inserted into frame 10. As shown in FIG. 13, a bracket 74 extends from a top rear frame bar 14B to a bottom rear frame bar 14D. The bracket 74 has a set of slots spaced to receive rear vertical support tabs 64 of the modular shelf units 42 (See FIG. 7). Bracket 74 is attached to rear shelf member, e.g. using two fasteners 76—one on top and one on bottom. In one implementation, once the set of modular shelf units 42 has been inserted into the frame by securing tabs 58, 60, 62 into notches 66, 68, 70, bracket 74 is installed into locker unit and secured to frame to prevent the modular shelf units from moving relative to frame 10.

FIG. 13 is rear perspective views of an example locker system with a set of modular shelf units installed. As shown in FIG. 13, the modular shelf units extend to the right of the front intermediate vertical support column 18 (when the locker system is viewed from the front). A wiring and access compartment 78 is formed to the left of the front intermediate vertical support column 18. Once the locker system has been installed, if it is necessary to remove one of the modular shelf units from the locker, it is possible to remove the bracket 74 from within the wiring and access compartment 78. The particular modular shelf unit to be removed 42 may then be detached from the frame by unscrewing the fastener extending through aperture 76 (see FIG. 6) that is being used to secure the modular shelf unit 42 to the frame 10. The modular shelf unit may then be removed through the front of the storage locker system and replaced as desired without requiring complete disassembly of the storage locker system and without requiring removal of any other modular shelf unit 42.

Figure 14:
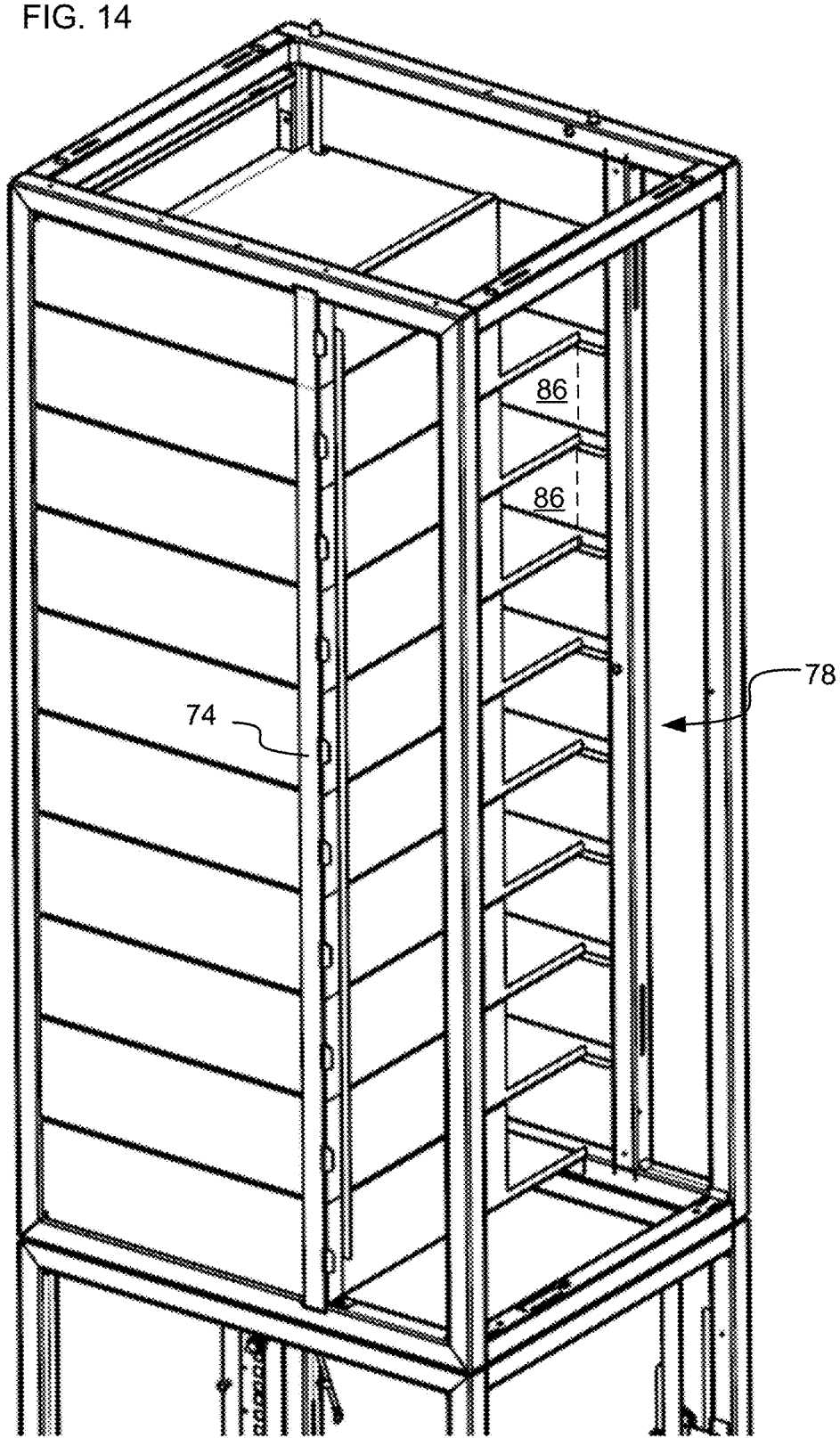
Figure 19A:
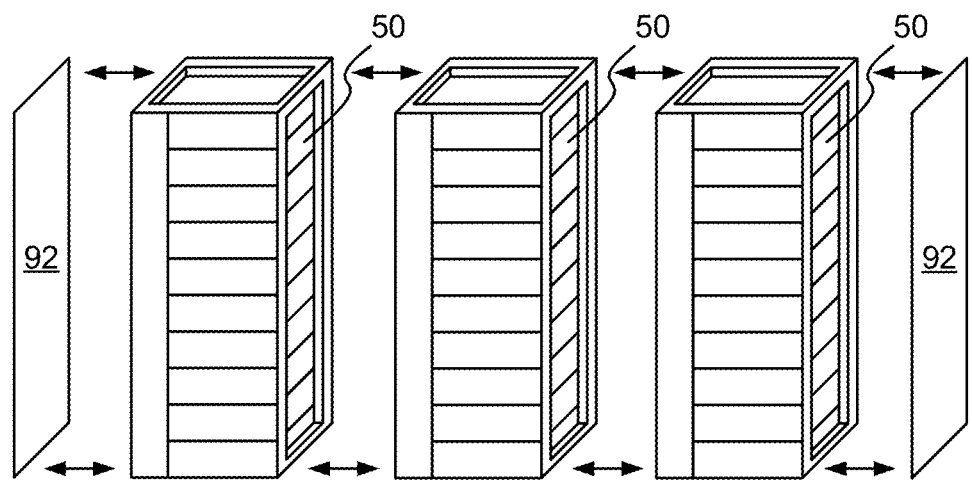
FIGS. 19A and 19B are front perspective views of a multiple cabinet charging locker system according to some embodiments.
Figure 19B:
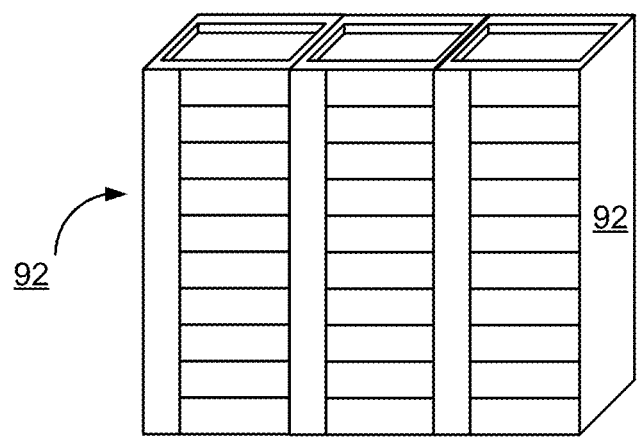

By forming each modular shelf unit 42 as a single part that includes the shelf bottom, as well as integral left 46, back 48, and right-side walls 50, it is possible to form locker bays without the use of additional or redundant side panels 92 (See FIGS. 19A & 19B). Specifically, the storage locker system shown in FIGS. 13 and 14 may be installed adjacent a similarly configured storage locker system (see FIGS. 19A-19B) for example by having the vertical portions of the front and rear frames of similarly configured storage locker systems abut. In this installed configuration, side panels 92 are not required on each of the individual storage locker systems, but rather only on ends of the runs, to thereby further reduce manufacturing costs by eliminating duplicative panels. Hence, exterior sheathing panels 92 are only required on units that are freestanding or on ends of runs of adjacent contiguous units.

Figure 18A:
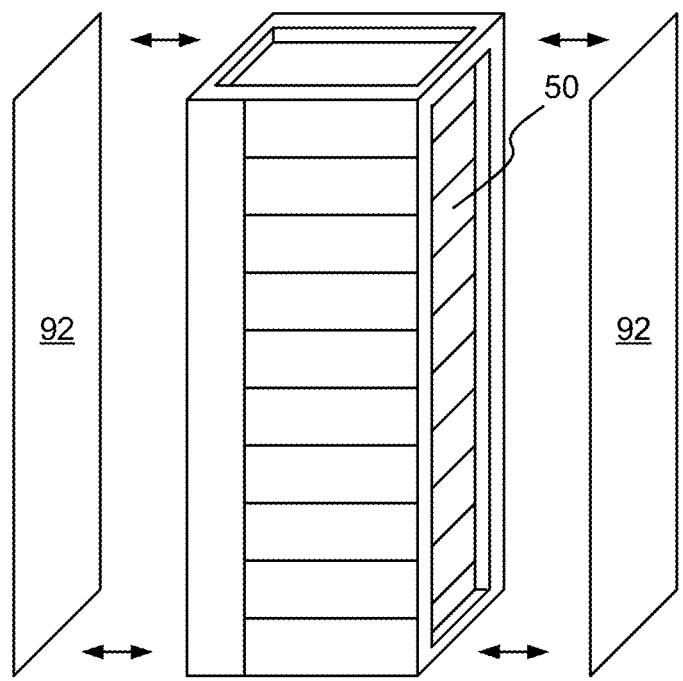
FIGS. 18A and 18B are front perspective views of a single cabinet charging locker system according to some embodiments.
Figure 18B:
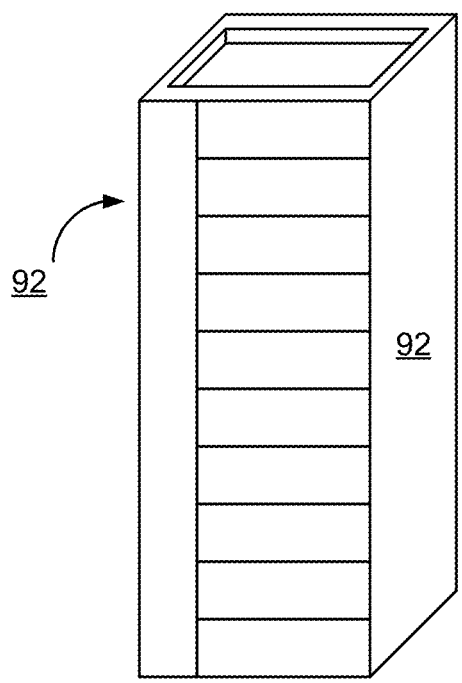

For example, FIGS. 18A & 18B show a single cabinet charging locker system whereas FIGS. 19A & 19B show a multi-cabinet locker system. As shown in FIGS. 18A & 18B, where a single cabinet locker system is provided as a stand-alone deployment, it may be aesthetically advantageous to seal the interior of the locker system using left and right external side panels 92. As shown in FIGS. 19A & 19B, if two or more locker cabinets are deployed side-by-side, it is not necessary to insert additional external side panels 92 between the adjacent cabinets, since aesthetically it does not make any difference and the walls 50 of the modular shelf units prevent access from one locker cabinet to the adjacent locker cabinet. Thus, a cabinet locker system incorporating multiple individual locker cabinets still only requires a single pair of left and right external side panels 92.

Figure 15:
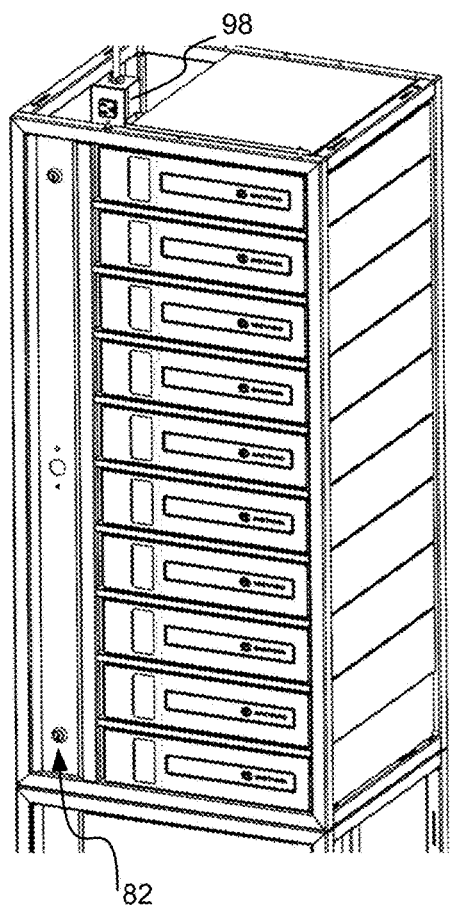
FIGS. 15-16 are front perspective views of an example charging locker according to some embodiments.
Figure 16:
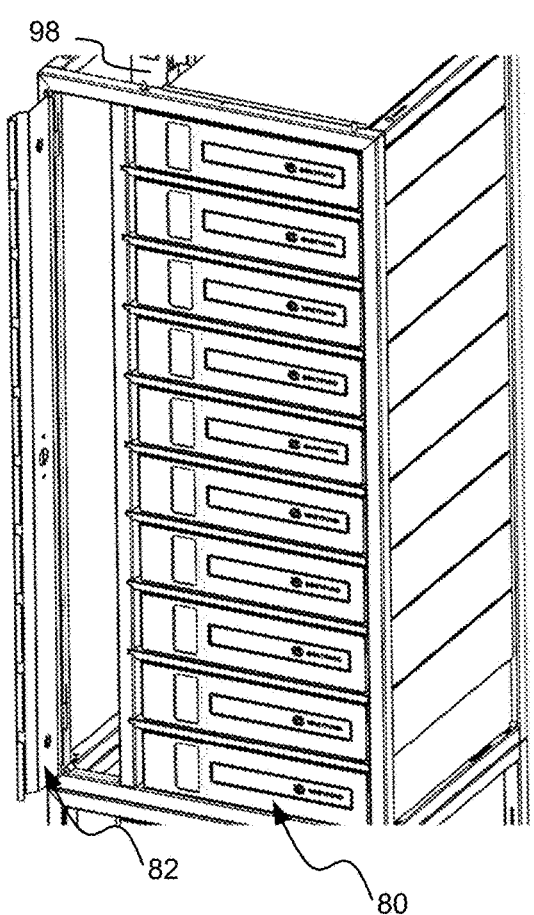

FIGS. 15 and 16 show an example locker system with doors 80 providing individual access to storage compartments defined by the modular shelf units 42. As shown in FIGS. 15 and 16, in an implementation the locker system includes a side access door 82 providing secure access to the wiring and access compartment 78. In some implementations, the side access door has one or more key locks to control access to this area. In other implementations, an electronic locking system may be used to provide card access or other digital access to the wiring and access compartment 78.

Figure 17:
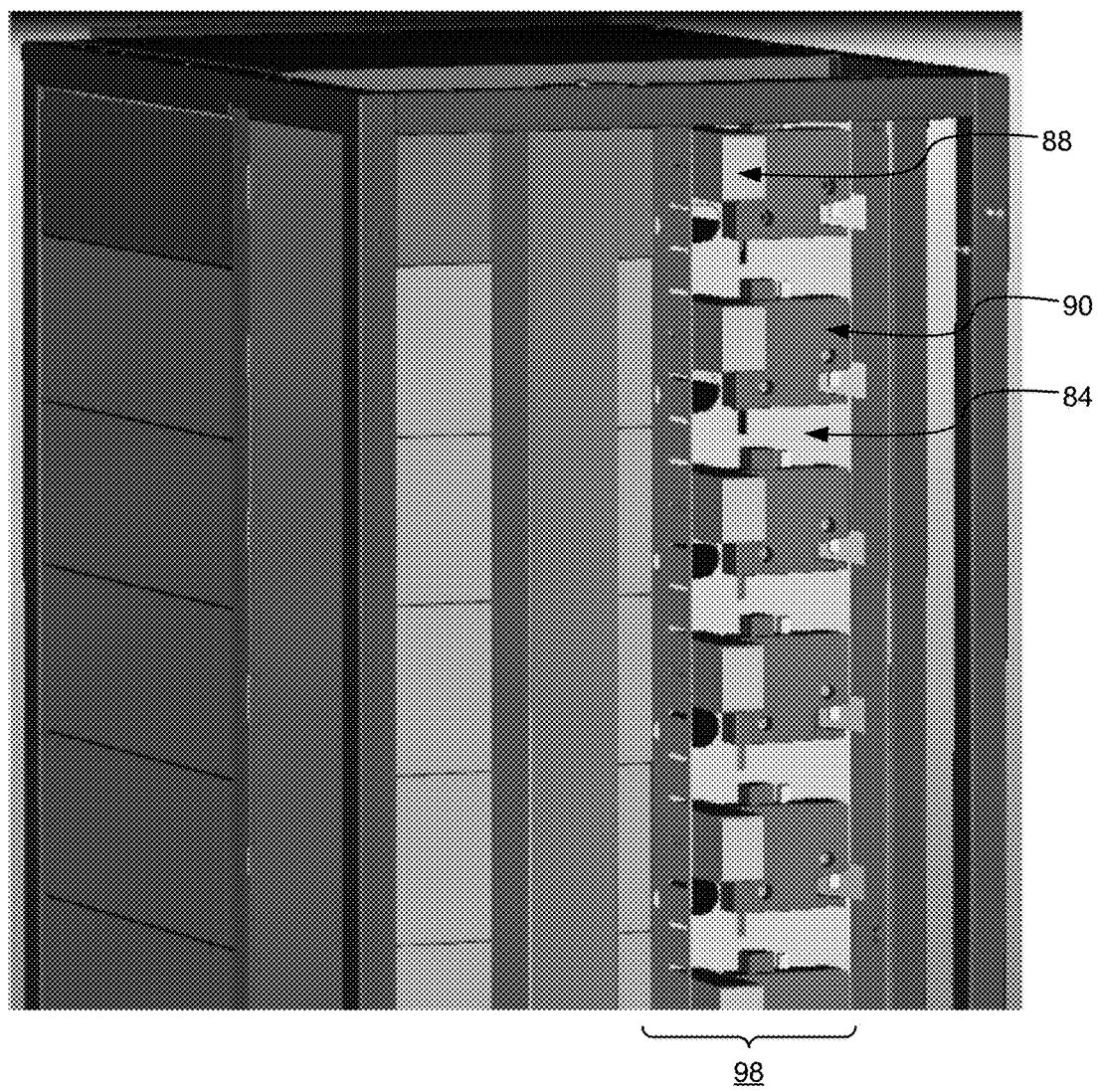
FIG. 17 is a side perspective view of an example charging locker showing the charging and locking mechanisms according to some embodiments.

In an implementation, all wiring associated with providing power and/or data connections to the storage compartments defined by the modular shelf units 42 is routed through the wiring and access compartment 78. The particular configuration of the electrical and data outlets provided within the charging locker will depend on the intended use of the storage compartments. In one implementation, modular electrical and data outlets are provided on a power/data strip 84 that has outlets facing into the storage compartments through power/data access window 86 defined by a cut-away in left side wall 46. In the implementation shown in FIG. 17 the power/data strip 84 incorporates both power/data outlets 88 and electronic locks 90 that are used to secure doors 80. Optionally individual components may be used instead of power/data strips 84 and likewise multiple strips may be provided, e.g. a first strip that contains the power/data outlets 88 and a second strip that mounts the electronic locks 90.

The wiring and access compartment 78 may also be used to store transformers for laptops where the laptops require the use of external electric transformers (bricks). The transformers may be mounted on individual shelves within the wiring and access compartment 78 or otherwise organized for storage within the wiring and access compartment 78. By locating all electrical charging/power supply components, as well as all mechanical components associated with locking the individual compartments within the wiring and access compartment 78, it is possible to perform all necessary maintenance without moving the unit from its installed location. For example, individual locks or sets of locks can be replaced, wiring systems can be changed or replaced, and individual doors can be manually opened and replaced as necessary.

Figure 20:
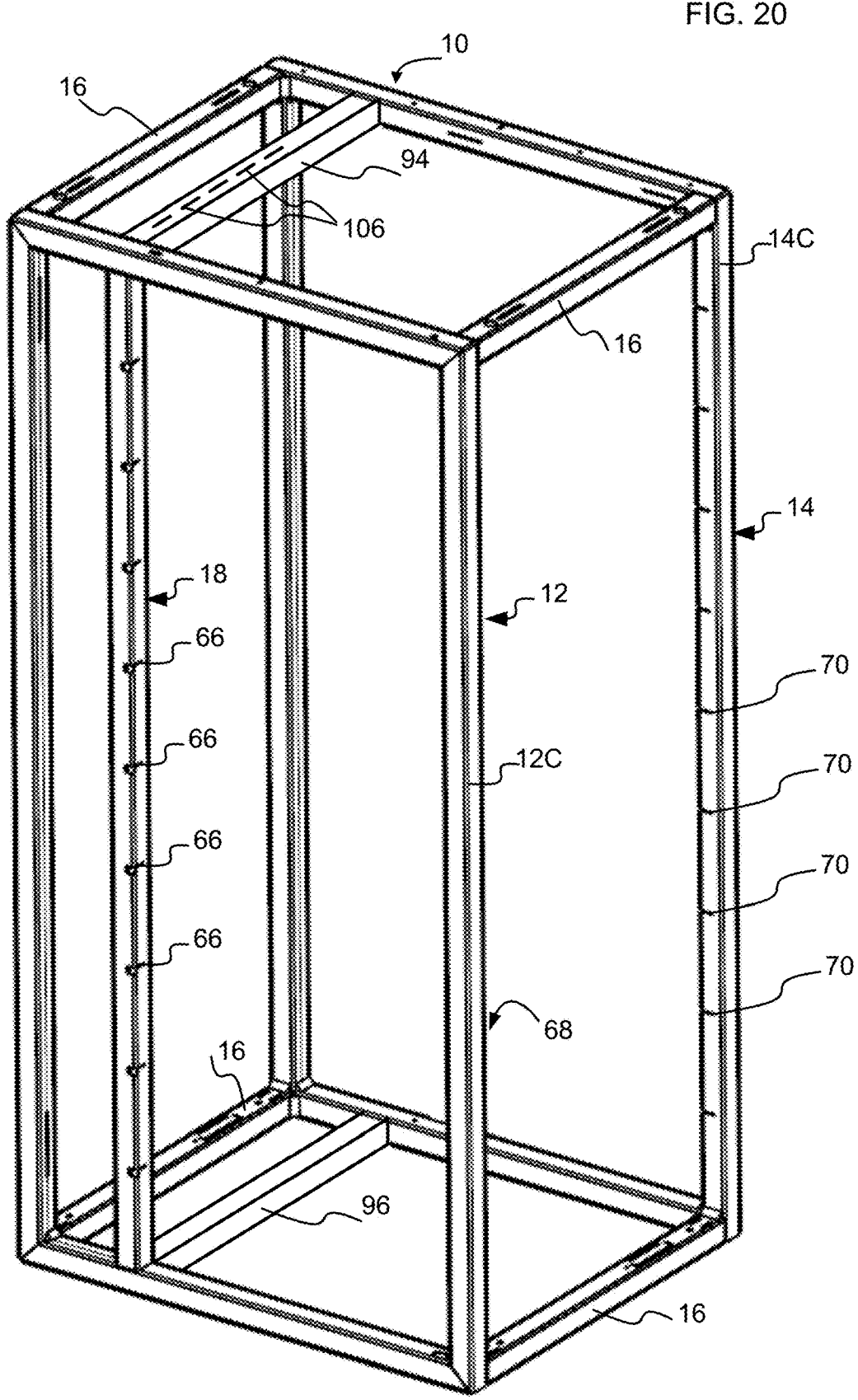
FIG. 20 is a front perspective view of an example frame for a charging locker according to some embodiments.

In some embodiments, as shown in FIG. 20, the frame 10 includes a top power strip mounting bar 94 and a lower power strip mounting bar 96. The upper and lower power strip mounting bars 94, 96, are located co-planar with front intermediate vertical support column 18 and define top and bottom interior edges of the wiring and access compartment.

Figure 25:
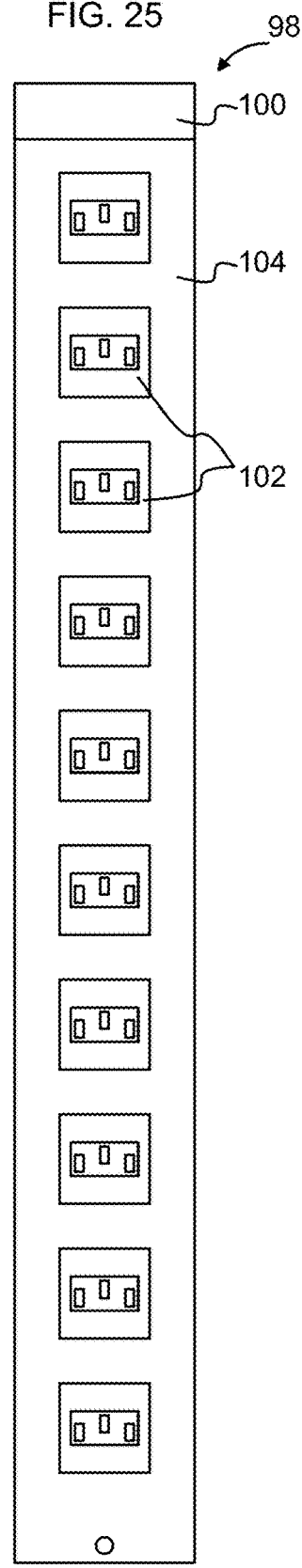

FIGS. 21-22 show an example power strip 98, in which FIG. 21 is a left side view of the power strip 98 and FIG. 22 is a front view of the power strip 98. FIGS. 23-25 show several additional example power strips with different types of power connectors. The example interchangeable power strips 98 shown in FIGS. 21-25 are designed to be secured within wiring and access compartment 78 to top power strip mounting bar 94 and bottom power strip mounting bar 96. In some embodiments, as shown in FIG. 21, power the power strip 98 has a top hook 100 formed on a front surface 104 and has a plurality of electrical receptacles 102 also formed on the front surface 104. The top hook 100 is designed to fit into one of several slots 106 cut into a top surface of the top power strip mounting bar 94. When the power strip 98 is suspended by top hook 100 in one of the slots 106 toward the front of the locker cabinet, the electrical receptacles 102 are spaced such that one of the electrical receptacles 102 is accessible through a respective one of the power/data access windows 86 of each modular shelf unit 42. The power strip 98 may be secured to the bottom power strip mounting bar 96 using a mechanical fastener such as a machine screw.

In some embodiments, multiple power strips 98 may be secured to have different types of electrical receptacles 102 accessible through power/data access window 86. In some embodiments, three slots 106 are formed on top power strip mounting bar 94 in the region above power/data access window 86 to allow up to three power strips 98 to be retained within the wiring and access compartment 78 such that three electrical receptacles 102 are able to be accessed from within each modular shelf unit 42.

FIGS. 22-25 show example power strips 98 with different types of electrical receptacles 102. For example, FIG. 22 shows an example power strip with electrical receptacles 102 formed as USB ports. FIG. 23 shows an example power strip with electrical receptacles 102 formed on the ends of whips 108. FIG. 24 shows an example power strip with electrical receptacles 102 formed as barrel jacks. FIG. 25 shows an example power strip with electrical receptacles 102 formed as NEMA outlets. Power strips 98 may be provided with numerous other types of power outlets as well, depending on the type of power required by devices to be stored in the locker. Likewise, although each power strip 98 is shown as having a single electrical receptacle 102 for a given modular shelf unit 42, in some embodiments a given power strip may provide multiple electrical receptacles 102 at each modular shelf unit 42.

In some locker system installations, it may be desirable to provide a first type of electrical receptacle 102 in the interior of each modular shelf unit 42, whereas in other locker system installations it may be desirable to provide another type of electrical receptacle 102 in the interior of each modular shelf unit 42. By making the power strips 98 modular and interchangeable, and securable within the wiring and access compartment using a simple top hook 100 and single mechanical fastener, it is possible to quickly and easily customize the locker system installation to provide the desired type of electrical receptacles 102 within the modular shelf units 42. Likewise, it becomes possible to quickly and easily change the type of electrical receptacle 102 provided within the bays of the locker system by switching power strips 98 on installed locker systems.

As noted above, in some embodiments several slots 106 (such as three slots) are formed on top power strip mounting bar 94 in the region above power/data access window 86 to allow several electrical receptacles 102 to be presented for access within each modular shelf unit 42. If a given installation does not require use of the same number of power strips 98 as there are slots 106, a filler panel 108 may be used to cover portions of the power/data access window 86 to prevent access from the interior of the modular shelf units to the interior of the wiring and access compartment.

Figure 26:
Figure 27:
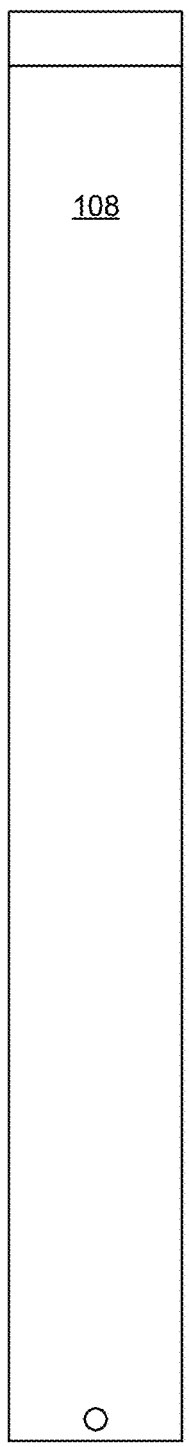
Figure 28:
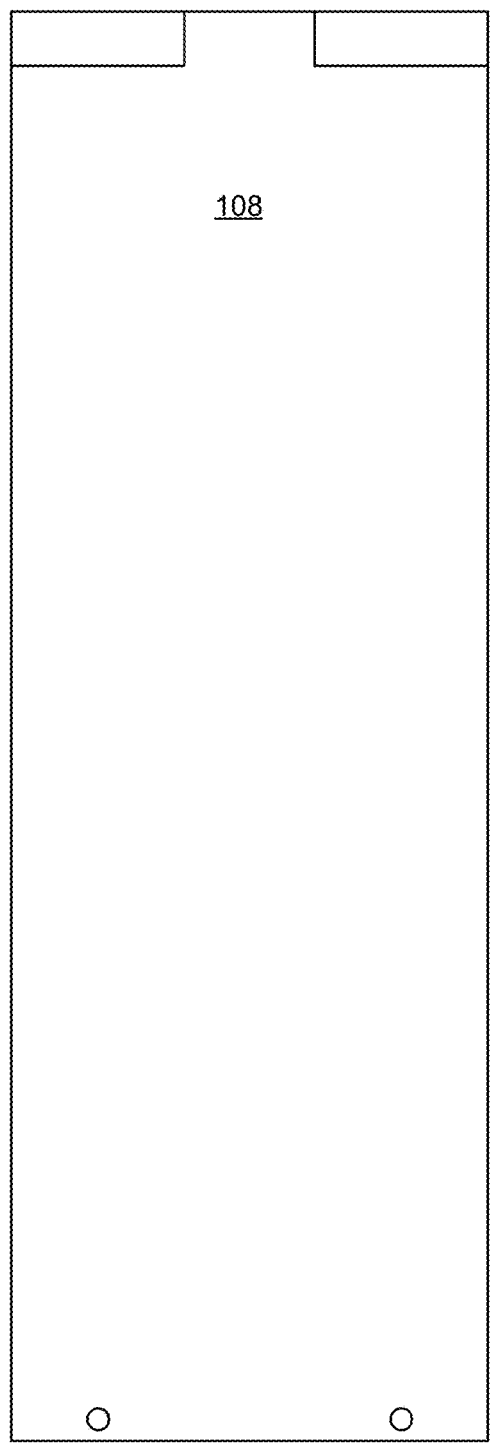

FIGS. 26-28 show several example filler panels 108, in which FIG. 26 is a side view of an example filler panel 108 and FIGS. 27-28 show front views of two example filler panels 108. As shown in FIG. 26, in some embodiments the filler panel 108 includes a top hook 100 that is configured in the same manner as the top hook 100 of power strip 98. Thus, the filler panel 108 may be secured to the top power strip mounting bar 94 and to the bottom power strip mounting bar 96 in the same manner as power strip 98. As shown in FIGS. 27 and 28, the filler panel 108 may be the same width as a power strip 98 (FIG. 27) or optionally may be twice as wide as a power strip 98 (FIG. 28). Where the filler panel 108 is twice as wide as a power strip 98, the filler panel 108 may incorporate multiple top hooks 100 to engage multiple slots 106 in top power strip mounting bar.

Although an implementation was shown in which the wiring and access area 78 was formed to the left of the modular shelf units, it should be understood that the design shown in the several figures and described herein could be implemented by using mirror images of the frame 10 and modular shelf units 42 to cause the wiring and access compartment 78 to be formed to the right of the modular shelf units.

Although an implementation has been shown in the figures in which ten similar charging lockers are shown together forming a single storage system, in other implementations fewer or greater numbers of similar charging lockers may be included in a storage system. Likewise, it should be understood that multiple similar charging lockers may be placed side by side to form a larger bank of charging lockers which may be individually or collectively controlled.

The following reference numerals are used in the drawings:

10 frame
12 front support
12C front right vertical bar
14 rear support
14C rear right vertical bar
15 corner
16 corner transverse piece
17 locating tab
18 front intermediate vertical support column
20 projecting tab
22 first corresponding slot
26 second corresponding slot
29 base cabinet
30 lower frame
32 lower front support
34 lower rear support
36 lower corner transverse piece
38 rack mount rail
39 base cabinet shelf
40 fastener
41 electronic equipment
42 modular shelf unit
44 floor
46 left side wall
48 back wall
50 right side wall
52 top flange
54 top left corner
56 top right corner
58 front right support tab
60 front left support tab
62 right rear support tab
64 rear vertical support tab
66 first notch
68 second notch
70 third notch
72 fourth notch
74 bracket
76 aperture
78 wiring and access compartment
80 door
82 side access door
84 power/data strip
86 power/data access window
88 power outlet
90 electronic lock
92 side panel
94 top power strip mounting bar
96 bottom power strip mounting bar
98 power strip
100 top hook
102 electrical receptacle
104 front surface
106 slot
108 filler panel A number of implementations have been described. Nevertheless, it will be understood that additional modifications may be made without departing from the scope of the inventive concepts described herein, and, accordingly, other implementations are within the scope of the following claims.

What is claimed is:

1. A charging locker, comprising:
   a frame;
   a plurality of modular shelf units, each modular shelf unit having an integral floor, at least one side wall, and a back wall, the plurality of modular shelf units being configured to extend vertically above one another to form a stack of modular shelf units in which the side walls and back walls of the plurality of modular shelf units form nearly contiguous first and second surfaces;
   a plurality of tabs on corners of each of the modular shelf units to be received in notches in the frame to support the modular shelf units relative to the frame; and
   a plurality of electrical receptacles, at least one electrical receptacle being accessible from within each of the modular shelf units;
   wherein the plurality of tabs are formed on two front corners and one rear corner of the each of the modular shelf units; and wherein a first of the tabs is formed on a first of the front corners to slide into a first forward-facing notch on the frame;

a second of the tabs is formed on a second of the front corners of the modular shelf unit to slide into a second rearward facing notch on the frame; and a third of the tabs is formed on the rear corner of the modular shelf unit to slide into a third forward facing notch on the frame.

2. The charging locker of claim 1, wherein the plurality of tabs are configured to enable the tabs to selectively engage the notches when the modular shelf unit is rotated a first direction, and are configured to enable the tabs to selectively disengage from the notches when the modular shelf unit is rotated in a second direction.

3. The charging locker of claim 1, wherein the tabs are formed on the floor of each modular shelf unit.

4. The charging locker of claim 1, wherein lower modular shelf units in the stack of modular shelf units support upper modular shelf units in the stack of modular shelf units.

5. The charging locker of claim 1, wherein each modular shelf unit has two side walls located on opposite sides of the floor and connected to the back wall along first edges to define four sides of a rectangular box.

6. The charging locker of claim 1, further comprising a power/data access window defined in one of the sides of each of the modular shelf units; wherein the at least one electrical receptacle is accessible from within the modular shelf unit via the power/data access window.

7. The charging locker of claim 6, further comprising at least one power strip, the at least one power strip containing a first subset of the plurality of electrical receptacles and being configured as a modular unit to be selectively inserted into the charging locker to present the electrical receptacles at the power/data access windows.

8. The charging locker of claim 7, wherein the frame defines a wiring and access compartment along one side of the modular shelf units, and wherein the at least one power strip is contained within the wiring and access compartment.

9. The charging locker of claim 1, further comprising a base cabinet formed below the frame and modular shelf units, the base cabinet comprising a pair of rack mount rails to support electronic equipment for supplying power and data services to the electrical receptacles.

10. The charging locker of claim 9, wherein the electrical receptacles include a plurality of Universal Serial Bus (USB) ports.

11. The charging locker of claim 1, wherein the frame includes a front rectangular shaped support, a rear rectangular shaped support, four corner transverse pieces connecting the front rectangular shaped support and rear rectangular shaped support at respective corners, and a front intermediate vertical support column spanning from a top bar of the front rectangular shaped support to a bottom bar of the front rectangular shaped support.

12. The charging locker of claim 11, wherein each the modular shelf units are supported by a first vertical bar of the front rectangular shaped support, a second vertical bar of the rear rectangular shaped support, and the front intermediate vertical support column.

* * * * *